June 14, 1938.  D. W. BERLIN  2,120,597
AUTOMATICALLY VARIABLE POWER TRANSMISSION APPARATUS
Filed Dec. 21, 1936  3 Sheets-Sheet 1
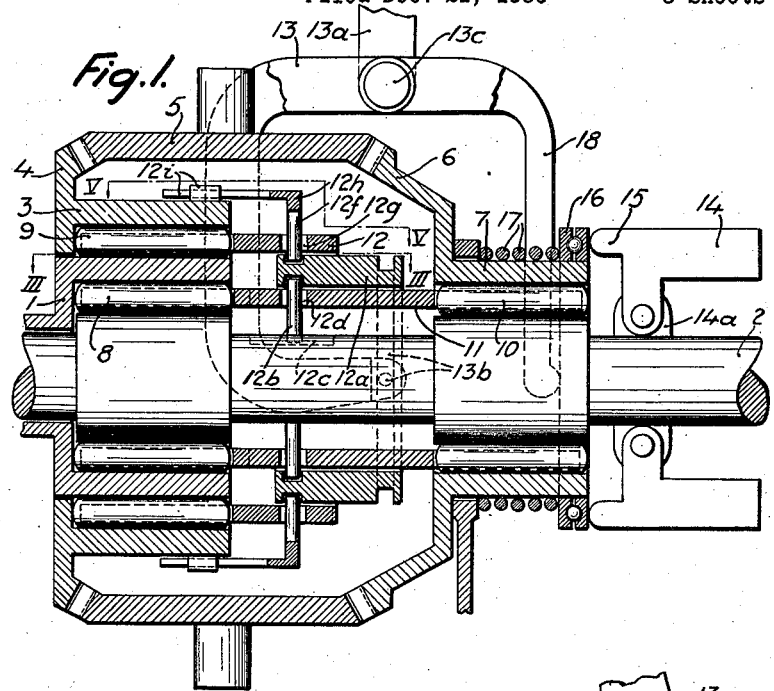
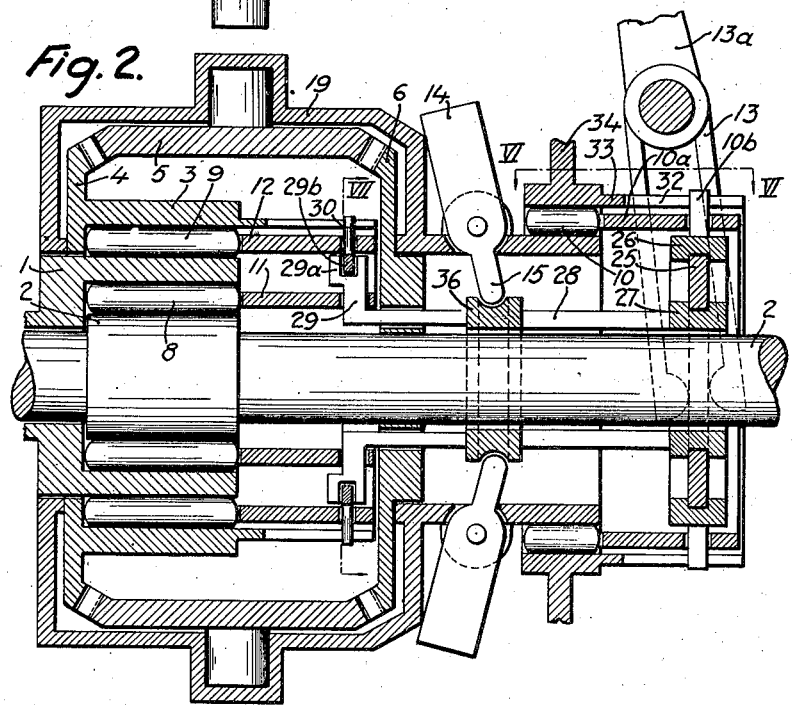
D. W. Berlin
INVENTOR
By Glascock Downing & Seebold
Attys.

June 14, 1938. D. W. BERLIN 2,120,597
AUTOMATICALLY VARIABLE POWER TRANSMISSION APPARATUS
Filed Dec. 21, 1936 3 Sheets-Sheet 2
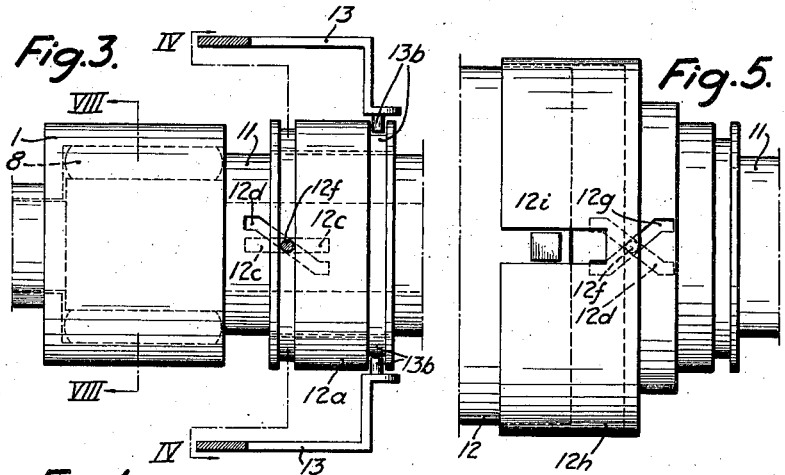
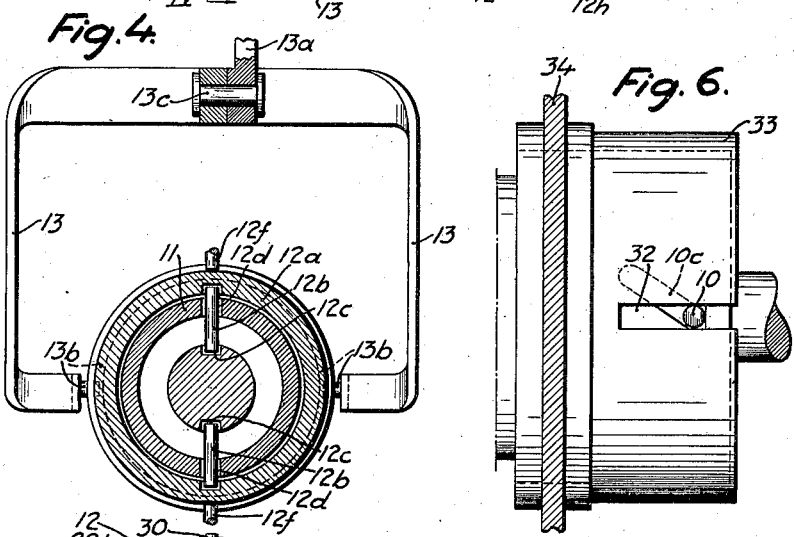
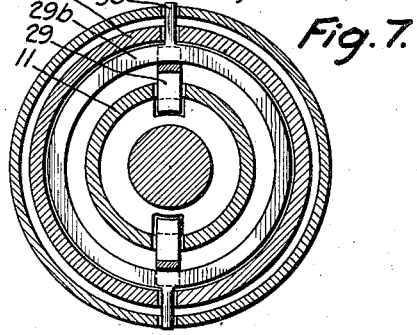
D. W. Berlin
INVENTOR
By Glascock Downing & Seebold
ATYS.

June 14, 1938.  D. W. BERLIN  2,120,597
AUTOMATICALLY VARIABLE POWER TRANSMISSION APPARATUS
Filed Dec. 21, 1936  3 Sheets-Sheet 3
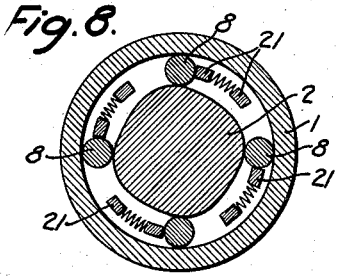
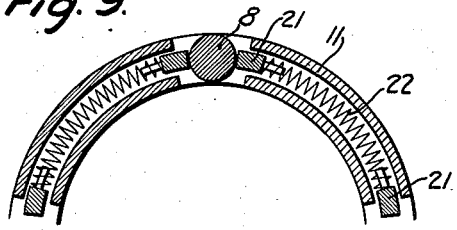
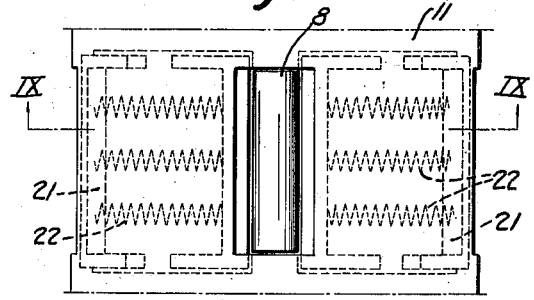

Patented June 14, 1938

2,120,597

UNITED STATES PATENT OFFICE 2,120,597

AUTOMATICALLY VARIABLE POWER TRANSMISSION APPARATUS

David Werner Berlin, Rasunda, Sweden

Application December 21, 1936, Serial No. 117,087
In Sweden December 22, 1934

4 Claims. (Cl. 74—260)

My present invention relates to an arrangement in automatically variable power transmission apparatus of the kind working with centrifugal weights and check couplings. My arrangement has for its object to unload, in a suitable degree, the pressure from the checking means, usually rollers of checking couplings, which shift to free motion, when the apparatus shifts to direct coupling. In case of free motion of a checking roller coupling, friction is created between the sliding surface and the rollers on account of the engaged positions, which they generally have. In case impurities exist in the lubricant also the rollers may be ground on the part sliding on the movable checking surface. My present invention removes the said difficulties practically completely.

The invention is characterized, among other things, by a centrifugal governor, adapted, at a certain speed of rotation, to actuate the member, or the members, which serve for engaging the checking means, in such a manner that the above mentioned unloading of the checking means is effected completely automatically. The centrifugal governor may either be fixed directly to the driven shaft or to a member, which practically is at rest during geared run but which participates in the rotation during direct coupling. In the former case the centrifugal weights of the governor are so adapted as to function within a certain range of revolutions, which corresponds to the range within which shifting from geared travel to direct coupling, or vice versa, takes place. In the latter case the same are adapted only for the purpose of providing for the required unloading force when the member, to which they are fixed, is in a rotary motion.

The centrifugal governor may be arranged also in such a manner relatively to the transmission apparatus, when the latter is of a type, in which the transmission members participate in the rotation during direct run, that the same releases only the secondary checking coupling, which during geared run checks the casing enclosing the transmission members, when shifting to direct coupling is effected.

Some constructional forms of the invention are illustrated diagrammatically in the accompanying drawings, in which Figure 1 shows a vertical axial longitudinal section of part of a gear box of the type, in which the transmitting members for the negative impulse are at complete rest during direct run, and Figure 2 shows a vertical axial longitudinal section of part of a gear box of the type, in which the transmitting members for the negative impulse during gearing run rotate in engagement with each other but are at mutual rest during direct run.

Figure 3 shows a partial section on the line III—III, Figure 1, of the device for shifting the checking couplings to either position for forward run or for backward run. The figure shows the central or free motion position, i. e. in which the two couplings do not act in either direction of rotation.

Figure 4 shows a cross section of Figure 3 on the line IV—IV. For the purpose of simplicity both figures show only the shifting device for the checking rollers next to the shaft.

Figure 5 shows a partial section on the line V—V, Figure 1.

Figure 6 shows a partial section on the line VI—VI, Figure 2, and

Figure 7 a partial section on the line VII—VII, Figure 2.

Figure 8 shows another cross section of Figure 3 on the line VIII—VIII, the checking rollers having been moved from the central position to the positions of engagement.

Figures 9 and 10, on a larger scale, show the arrangement of the checking rollers in the appertaining roller holder. Figure 9 is a cross section on the line IX—IX, Figure 10, and Figure 10 is a partial side view, the checking rollers being in the central position.

Figures 3, 4 and 8–10 refer to the constructional form according to Figure 1 but can be used fundamentally throughout also in the constructional form according to Figure 2.

Referring to Figure 1 numeral 1 indicates the eccentric sleeve, which, in a known manner, is actuated by centrifugal weights (not shown) from the driving shaft (not shown). 3 is an outer checking sleeve, which together with the toothed wheels 4, 5 and 6 transmit the negative impulse from the eccentric sleeve 1 to the secondary checking sleeve 7. 8 indicates the rollers of the primary coupling, which transmit the positive impulse directly to the driven shaft 2. 9 indicates the rollers of the primary outer coupling, which transmit the negative impulse to the toothed wheel 4, and 10 indicates the rollers of the secondary coupling, which finally transmit the negative impulse, which has been turned to a positive impulse, to the shaft 2. The toothed wheels 5 are mounted in the gear box casing or frame (not shown). Detailed descriptions of the centrifugal weights and of other members, above mentioned, appear from, for example, my prior U. S. Patent No. 1,939,100.

The rollers 8 and 10 are actuated or engaged by springs in a common roller holder 11 (Figures 1, 9, 10) and the rollers 9 are actuated or engaged by springs in another roller holder 12. For shifting to backward run, and vice versa, the roller holders 11, 12 may be turned relatively to the shaft 2 each in its direction in relation to each other by means of a manually operated lever 13a, a fork 13 turnably united with the same, at 13c, and a sleeve or the like 12a surrounding the shaft, the said sleeve being, by means of a pin and groove connection 13b, adapted to be moved to and fro on the shaft by means of the fork 13 at the same time as it rotates with the shaft 2. During the displacement the sleeve 12a together with accessory members, if any, is moved, thereby that one or more pins 12b (Figures 1, 4) which engage the sleeve 12a, each runs in its straight axially extending groove 12c, provided for example in the shaft 2. At the same time the pins 12b each slide in its obliquely cut cam groove 12d (Figures 3, 4, 5) in the roller holder 11. Similar pins 12f and cam grooves 12g turn the roller holder 12 at the same time; the last mentioned grooves are obliquely cut relatively to the grooves 12d in such a manner that one roller holder is turned in a direction opposite to that of the other, see Figure 5.

At their ends the cam grooves of the roller holders 11 and 12 again extend in axial direction, if desired, by which locking at the shaft 2 of the roller holders relatively to the checking surfaces is effected. The pins 12f are secured in a sleeve 12h mounted around the checking sleeve 3 and guided by pins and a groove connection 12i (Figures 1, 5), so that the sleeve 12h can be pushed on the sleeve 3 but not be turned relatively to the same. The pins 12f run in a peripherally extending groove in the sleeve 12a, by which they are able to rotate relatively to the sleeve and the pins 12b. In the roller holders 11 and 12 each roller is placed between two rails or rods 21, which are movable in the path of the rollers and actuated against the rollers by springs 22, which by the rotation of the roller holder may be pressed against the rollers, as is shown in Figure 8, so as to hold the same in position for gear run, during which they, as known, have a checking action in one direction and are freerunning in the other. At direct run the rollers 8 are constantly fixed, the rollers 9 and 10 running freely.

The device having been shifted from geared run to direct coupling and the speed being increased, the checking rollers which then run freely shall, according to the invention, as mentioned, be released in a certain degree, from their engaged position, see Figure 8, i.e. the roller holder shall be automatically rotated back so much that the spring pressure on the rollers is wholly or partly unloaded. For this operation the fork 13 is rotatably connected with the lever 13a, and for the rest arranged, via an arm 18, a ball bearing 16, which is movable axially, and a spring 17, to be actuated by the above mentioned centrifugal governor. The governor consists substantially of centrifugal weights 14, which are mounted in ears 14a, rotating with the shaft 2, and which begin to actuate the ball bearing 16 by means of oscillating parts 15, when the shaft has been speeded up. At a certain speed this actuation becomes so strong that all of the three roller holders, while overcoming the resistance of the spring 17, are rotated as much as required for unloading the spring pressure on the rollers. During this operation the rollers 8 maintain their positions of engagement in spite of the spring pressure on them being unloaded, which is due to the fact that the engagement between the sleeve 1 and the shaft 2 provides for the continued transmission of the torsional moment and that the angle of engagement is so small that the rollers do not slide backwards out of the position of engagement.

In Figure 2 numerals 1—6, 8—14 refer to the same parts as in Figure 1. 19 indicates a casing enclosing the apparatus, said casing rotating during direct coupling. The rollers 10 of the secondary coupling in this case check the casing 19 during geared run. The roller holders 11 and 12 are shifted by means of a mechanism consisting of the manually operated lever 13a, the fork 13, an annular disc 25, mounted in one outer and one inner grooved ring 26, 27 around the shaft 2, and by bars 28 and pins 29, 30. The pins 29 run in a cam groove in the roller holder 11, the pins 30 in a cam groove in the roller holder 12, like in the embodiment according to Figure 1. Each of the pins 29 is formed as a little fork 29a, grasping a rotatable ring 29b, to which the pins 30 are secured. Thereby the latter are able to rotate with the roller holder 12 independently of the roller holder 11. The disc 25, the rings 26, 27 and the bars 28 are displaced along the shaft 2 by means of the lever 13a and during this operation the roller holders 11, 12 are shifted in the same manner as in Figure 1. At the same time the roller holder 10a is shifted by a pin 10b on the ring 26 by the said pin engaging a cam groove 10c of the roller holder (Figure 6). During this movement the pin is guided by a groove 32 of a sleeve 33, which is rigidly connected to a frame part 34, said groove 32 extending parallel with said shaft. When the gear has been shifted from geared run to direct coupling and the speed is increased, the spring pressure on the rollers and in this case particularly on the rollers 10 of the secondary checking member, shall be unloaded. This is effected in such a manner that the weights 14 of the governor, which in this constructional form have jointed connection with the casing 19, by centrifugal force, are swung on the pivots 14b so that they tend to be located radially thereby actuating with their portions 15 the bars 28 via the grooved ring 36 with the effect that the roller holders 10a, 11 and 12 are automatically rotated back just so much from the end position obtained by the manual control 13a that the spring pressure on the rollers is wholly or partly released. As shown in the drawings the manual control 13a has to follow parts 36, 28, 27 et cetera in said releasing motion but in practice the embodiment may be provided with an elastic connection in the parts between members 13a and 14 in order to avoid such irregular motions. In the constructional form according to Figure 2 the springs 22 are assumed to be completely encased, as shown by Figures 9 and 10. The springs may be either helical springs or flat springs.

Finally, it may be pointed out that the arrangement shown in Figures 8—10 fundamentally can be used also without connection with the centrifugal governor also in transmission devices of other constructions.

Having now described my invention, what I claim as new and desire to secure by Letters Patent is:

1. In an automatically variable power transmission device, a driving sleeve freely rotatable on a shaft to be driven, a group of rollers arranged for circumferential movement between said sleeve and said shaft adapted to be moved to one position to cause direct coupling of said sleeve with said shaft, a checking sleeve arranged adjacent said driving sleeve, a second group of rollers interposed between said sleeves and adapted to be circumferentially moved to one position to couple said sleeves, means including gears connecting said second sleeve to said shaft to provide a geared coupling between said driving sleeve and said shaft, a roller holder for moving said first group of rollers, a second roller holder for moving said second group of rollers, means associated with said holders for causing simultaneous movement of one group of rollers to an engaged position and the other group to an idle position, and rotatable means operatively responsive to the rotation thereof and the resulting centrifugal force acting thereon for moving the holder of the idle rollers to a free position.

2. A device according to claim 1 in which the centrifugal acting means is fixed directly to the driven shaft.

3. A device according to claim 1 in which the centrifugal acting means is fixed to an abutment member which is at rest during gear drive but which participates in the rotation during direct drive.

4. A device according to claim 1 in which the roller holders are provided with oblique grooves for guiding the circumferential movement thereof, said grooves merging into axial grooves towards the ends thereof so as to provide for locking the roller holders in an engaged position.

DAVID WERNER BERLIN.